UNITED STATES PATENT OFFICE.

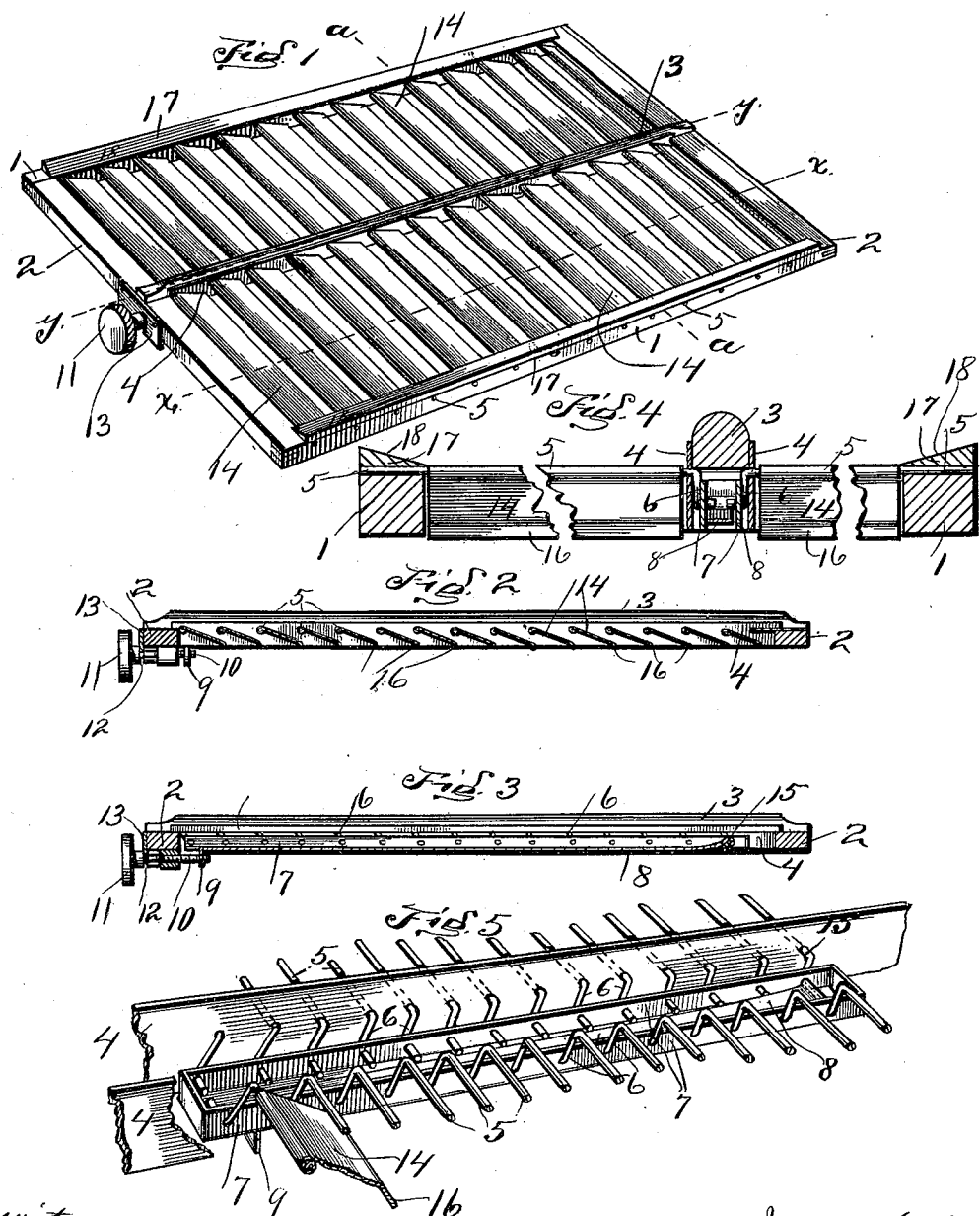

DAVID LIPPY AND LORENZO D. PATTEN, OF MANSFIELD, OHIO, ASSIGNORS TO THE LIPPY MANUFACTURING COMPANY, OF SAME PLACE.

SEPARATOR.

SPECIFICATION forming part of Letters Patent No. 665,332, dated January 1, 1901.

Application filed May 10, 1900. Serial No. 16,166. (No model.)

*To all whom it may concern:*

Be it known that we, DAVID LIPPY and LORENZO D. PATTEN, citizens of the United States, residing at Mansfield, in the county of Richland and State of Ohio, have invented certain new and useful Improvements in Separators; and we do hereby declare that the following is a full, clear, and exact description of the same, reference being had to the annexed drawings, making a part of this specification, and to the figures of reference marked thereon, in which—

Figure 1 is a perspective view. Fig. 2 is a longitudinal section on line $x\ x$, Fig. 1. Fig. 3 is a longitudinal section through the center of the separator. Fig. 4 is a transverse section through line $a\ a$, Fig. 1. Fig. 5 is a view showing the blade-arms, also portions of the blades and the connection for the inner ends of the blade-arms.

The present invention has relation to separators designed and calculated for use in threshing-machines; and it consists in the different parts and combination of parts hereinafter described, and particularly pointed out in the claim.

Similar numerals of reference indicate corresponding parts in all the figures of the drawings.

In the accompanying drawings, 1 represents the longitudinal members of the frame, and 2 the cross members of the frame, said members being connected together in such a manner that a rectangular frame will be produced.

To the end members 2 is securely attached in any convenient and well-known manner the center rail or rib 3, to which center rib are connected in any convenient manner the flanges or blades 4, said flanges or blades being also connected to the end members 2.

To the longitudinal members 1 and to the flanges or blades 4 are journaled a series of shafts 5, which series are provided with the cranks or bent portions 6.

To the cranks 6, formed upon the shafts 5, is connected the open rectangular bar 7, which rectangular bar is located substantially as shown in Figs. 3 and 5.

Within the rectangular bar 7 is located the separator-blade-operating rod 8, which operating-rod is provided with the right-angled portion 9, said right-angled portion being provided with a screw-threaded aperture which receives the screw-threaded rod 10, said screw-threaded rod being provided with an operating-knob 11, and for the purpose of holding the screw-threaded rod 10 in a fixed relative position the outer non-screw-threaded portion of said rod is provided with the annular groove 12, into which annular groove is seated the plate 13, which plate is securely fixed to the rear end member 2, as illustrated in Fig. 1.

For the purpose of opening and closing the separator-blades 14 the forward shaft 15 is preferably formed of a single piece and extends across both sections of the separator, which shaft imparts a reciprocating movement to the open rectangular bar 7 when the screw-threaded bar 10 is turned, it being understood that when said bar is turned in one direction the bar 8 will be pulled and when turned in the opposite direction said bar will be pushed, thereby providing a means for adjusting the separator-blades 14 for different kinds of grain.

It will be understood that by our peculiar arrangement we are enabled to provide a single separator capable of separating all kinds of grain and at the same time adjusting the separator with reference to the dryness or dampness of the straw and chaff from which the grain is to be separated.

For the purpose of properly directing the air-blast with reference to the separator-blades 14 the forward edges of said blades are bent downward, or, in other words, are provided with the downturned flanges 16, by which arrangement a portion of the blast will be shunted upward, thereby lifting the chaff and straw and allowing the grain to pass downward and between the open spaces. Another object and purpose of turning the separator-blades downward at their forward ends is to allow the blades to fit closely directly under the shafts 5 and 15 when it is desired to close the separator.

For the purpose of preventing the grain from lodging upon the side members 1 of the frame their top or upper sides are provided with the strips 17, said strips being provided with the inclined upper faces 18. The strips 17 also assist in holding the shafts 5 and 15 in proper relative position, inasmuch as they are so located that they will come directly over the bearings of said shafts, as illustrated in Fig. 1.

Having fully described our invention, what we claim as new, and desire to secure by Letters Patent, is—

The combination of a rectangular frame, a series of shafts journaled to the frame and to center longitudinal flanges, cranks located upon the transverse shafts and between the center longitudinal flanges, separator-blades fixed to the shafts, a rectangular bar located between the center flanges and a rod connected to a crank formed upon the forward shaft of the separator, and means for imparting reciprocating movement to the open rectangular bar and to the operating-bar, substantially as and for the purpose specified.

In testimony that we claim the above we have hereunto subscribed our names in the presence of two witnesses.

DAVID LIPPY.
LORENZO D. PATTEN.

Witnesses:
JAS. J. MAGUIRE,
JAS. WM. GALBRAITH.